United States Patent [19]

Inoue

[11] Patent Number: 5,065,343

[45] Date of Patent: Nov. 12, 1991

[54] GRAPHIC DISPLAY SYSTEM FOR PROCESS CONTROL USING A PLURALITY OF DISPLAYS CONNECTED TO A COMMON PROCESSOR AND USING AN FIFO BUFFER

[75] Inventor: Kenichi Inoue, Tokyo, Japan

[73] Assignee: Yokogawa Electric Corporation, Tokyo, Japan

[21] Appl. No.: 311,007

[22] Filed: Feb. 14, 1989

[30] Foreign Application Priority Data

| Mar. 31, 1988 | [JP] | Japan | 63-79539 |
| Oct. 24, 1988 | [JP] | Japan | 63-267940 |
| Oct. 24, 1988 | [JP] | Japan | 63-267941 |
| Oct. 24, 1988 | [JP] | Japan | 63-267942 |

[51] Int. Cl.$^5$ ............................................. G06F 15/20
[52] U.S. Cl. .................................... 395/162; 340/798; 395/164
[58] Field of Search ........ 364/518, 521, 200 MS File, 364/137, 146; 340/798

[56] References Cited

U.S. PATENT DOCUMENTS

| 4,636,858 | 1/1987 | Hague et al. | 364/518 X |
| 4,725,831 | 2/1988 | Coleman | 340/798 X |
| 4,783,731 | 11/1988 | Miyazaki et al. | 364/200 |
| 4,802,118 | 1/1989 | Honda et al. | 364/900 |
| 4,811,052 | 3/1989 | Yamakawa et al. | 364/200 X |
| 4,910,765 | 3/1990 | Matsuse et al. | 364/137 X |
| 4,935,886 | 6/1990 | Choka | 364/146 X |

Primary Examiner—Gary V. Harkcom
Assistant Examiner—Mark K. Zimmerman
Attorney, Agent, or Firm—Moonray Kojima

[57] ABSTRACT

A graphic display system comprising a plurality of graphic display units which are connected to a host processor through a common bus and providing useful quick response characteristics as a man-machine interface for process control, wherein a common memory of two ports, one of which is connected to the common bus and the other is connected to an internal bus, is provided in each graphic display unit and a part of the common memory is used for transmission of high level command/data with the host processor and comprises a FIFO (i.e. first in first out) buffer.

3 Claims, 14 Drawing Sheets

SW: Position a

SW: Position b

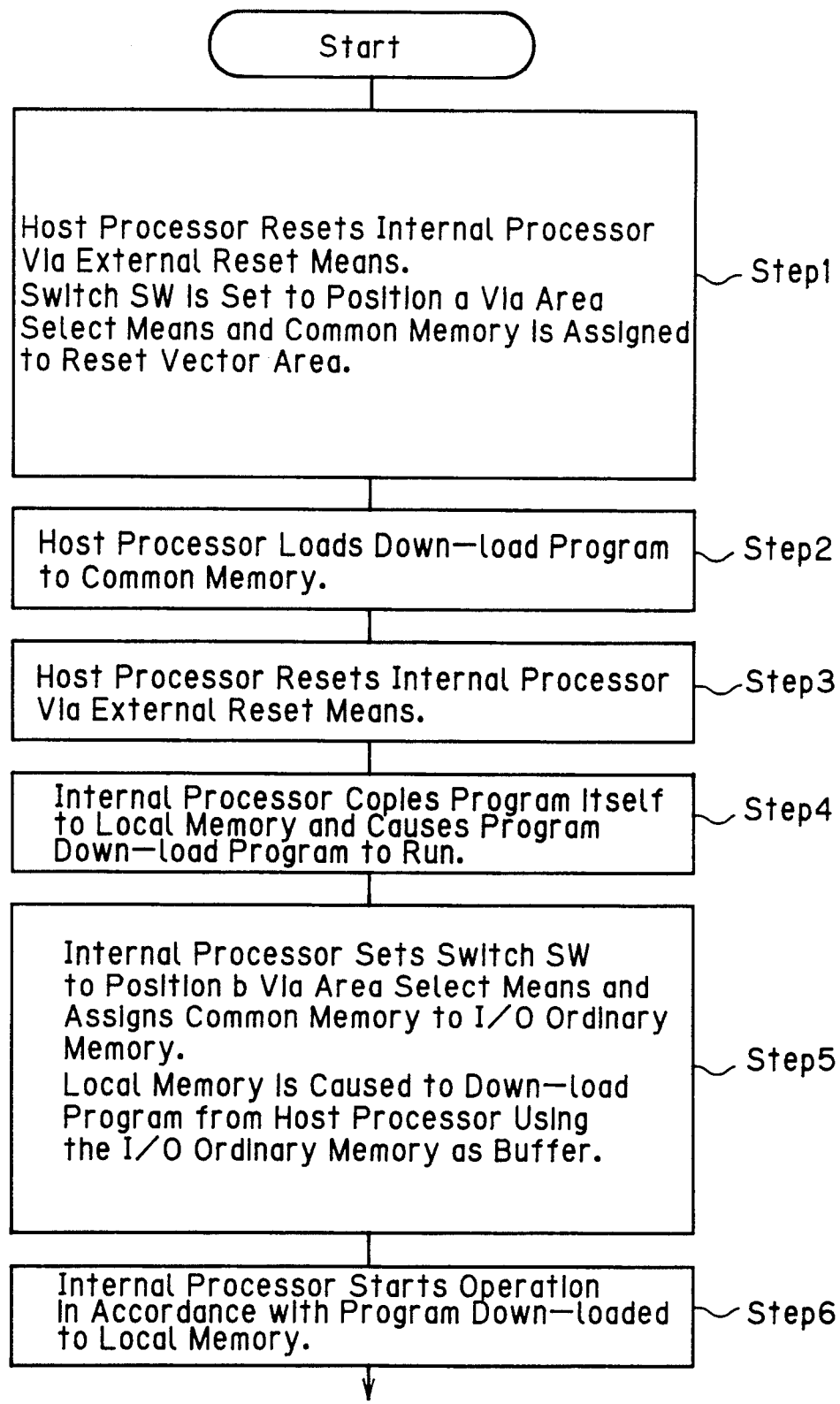

Graphic Plane

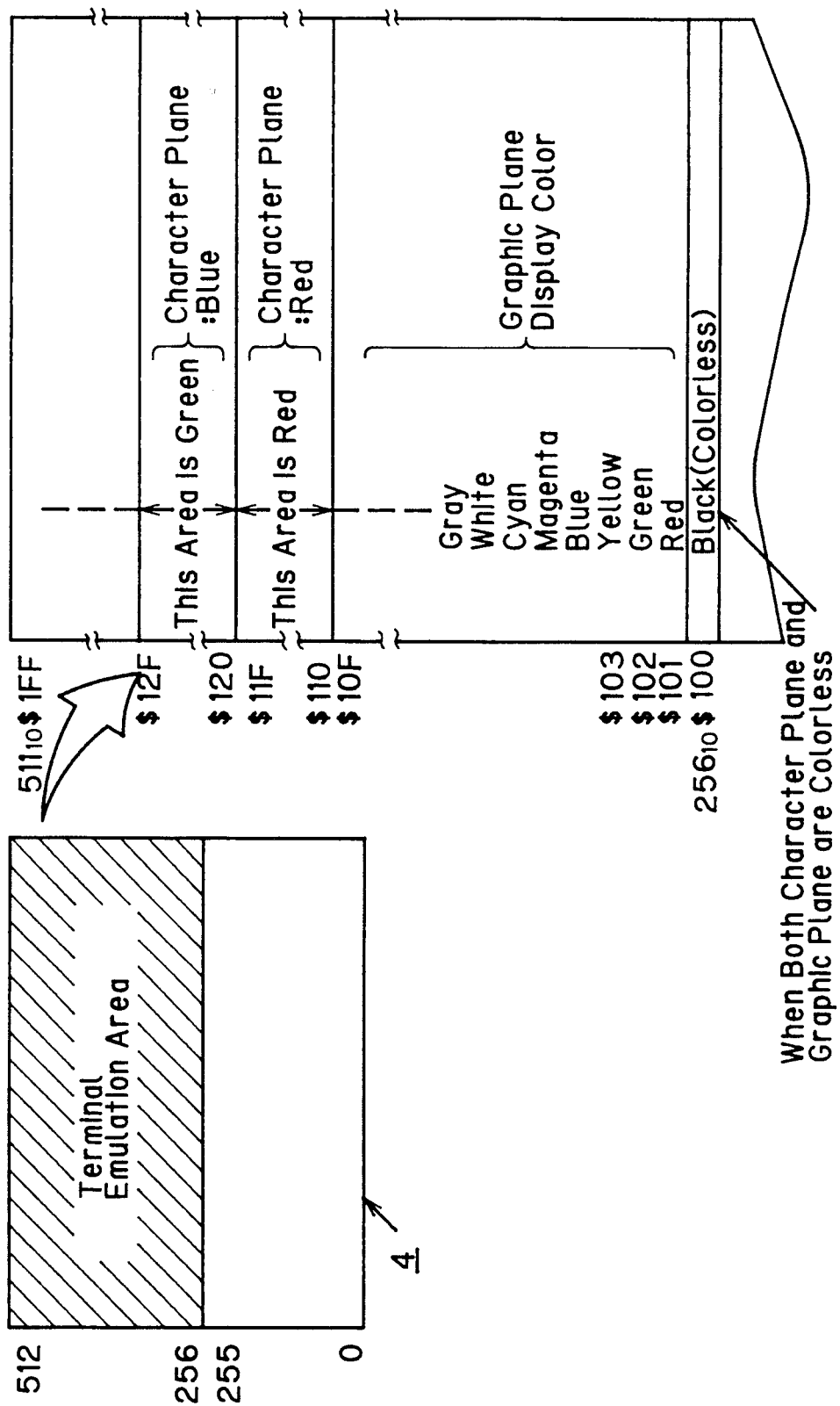

GRAPHIC DISPLAY SYSTEM FOR PROCESS CONTROL USING A PLURALITY OF DISPLAYS CONNECTED TO A COMMON PROCESSOR AND USING AN FIFO BUFFER

BACKGROUND OF THE INVENTION.

1. Field of Invention

This invention relates to a graphic display system which can be effectively used to provide a man-machine interface for process control; and more particularly, to such a system comprising a plurality of graphic display units which are connected to a host processor through a common bus, wherein each graphic display unit receives drawing commands and display commands sent from the host processor and displays in parallel graphics and patterns in compliance with the characteristics of information on a display unit, such as a CRT.

2. Description of the Prior Art

A graphic display unit, which is used to provide a man-machine interface for process control, is required to effectively display a variety of information at high speed on a display means for managing and controlling the plant as a whole.

FIG. 1 depicts a prior art graphic display unit wherein a host processor 1 is connected to a common bus BS; graphic display/keyboard controller $2_1 \ldots 2_n$, enables the function of a man-machine interface to be connected to common bus BS and includes therein an extensive subprocessor 3. Common bus BS is also connected to an interface of a disk unit and a communication interface 6.

When host processor 1 controls controllers $2_1 \ldots 2_n$, (1) the controller reads, as the bus master, commands written in the command block of main memory 11 of host processor 1, in accordance with instructions from host processor 1, or (2) host processor 1 tries to obtain a bus right within the controller and transfers a command train by directly writing the commands in internal memory 20.

However, in the first (1) case, the controller has to become a bus master. Thus, the required configuration is complicated and overhead by transfer of bus right increases. This results in decreased performance drop which is no longer negligible.

In addition, the second (2) case lowers remarkably the processing speed of the subprocessor located within the controller because the bus right is lost.

SUMMARY OF THE INVENTION.

The invention aims to overcome the aforementioned and other problems and deficiencies of the prior art.

Accordingly, it is an object of the invention to provide a graphic display system wherein the host processor effectively transmits commands to a plurality of display controllers to enhance the efficiency of parallel processing.

It is another object to simplify the configuration of the graphic display system and to improve maintenance thereof.

It is a further object to realize an apparatus wherein a graphic display and a character display can be superimposed onto each other in one window of a multi-window display, and wherein each display can be controlled individually, and wherein the one window and other standard windows may co-exist, for display in the same display screen.

BRIEF DESCRIPTION OF THE DRAWINGS.

FIG. 12 is a flow chart depicting an example of the operations of the FIG. 8 embodiment.

FIG. 18 depicts a table of definitions written in the terminal emulation region of the color look-up table.

DETAILED DISCUSSION OF THE PREFERRED EMBODIMENTS.

Figure 1:
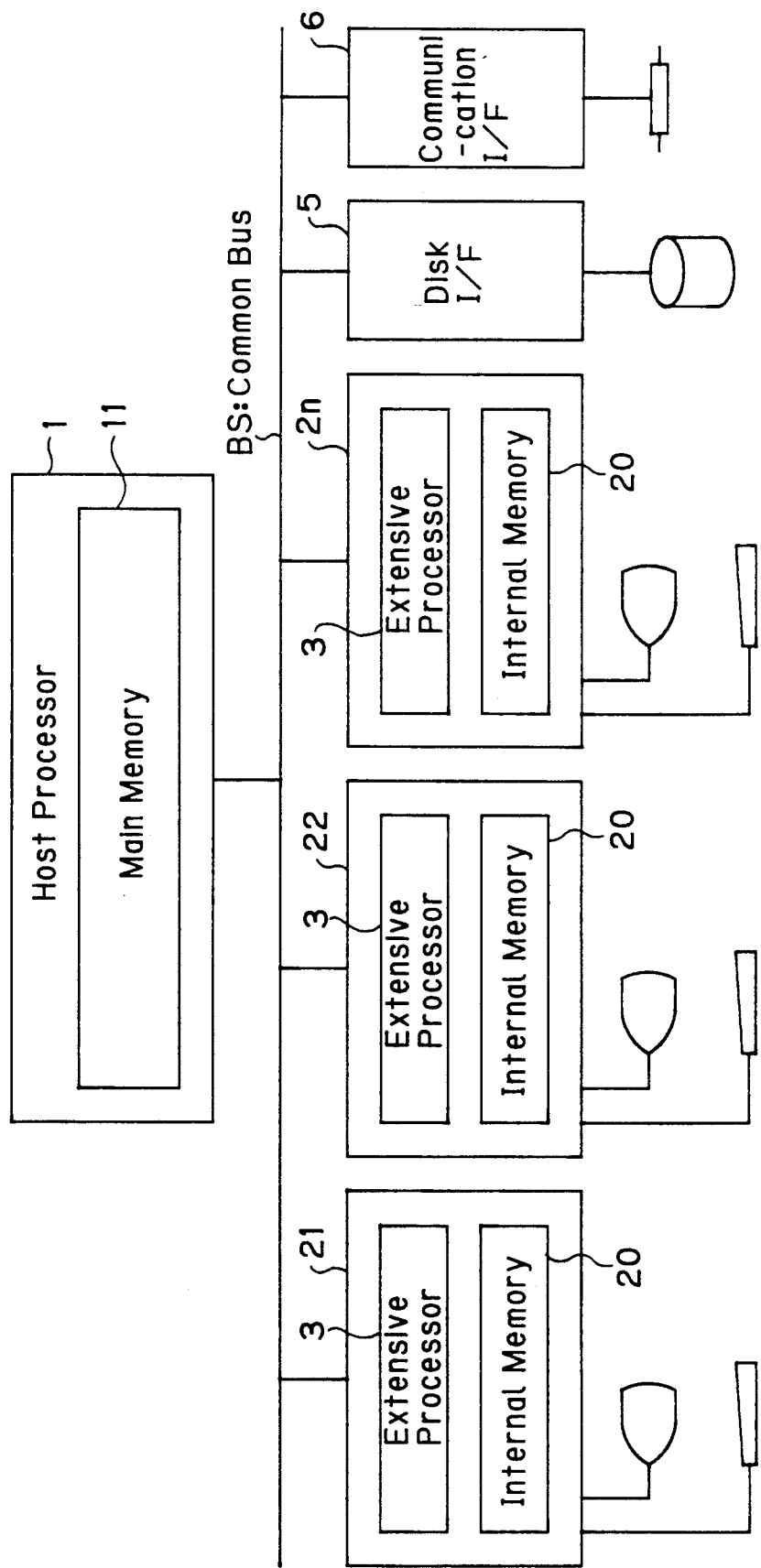
FIG. 1 is a conceptional view depicting an example of a prior art graphic display system.
Figure 2:
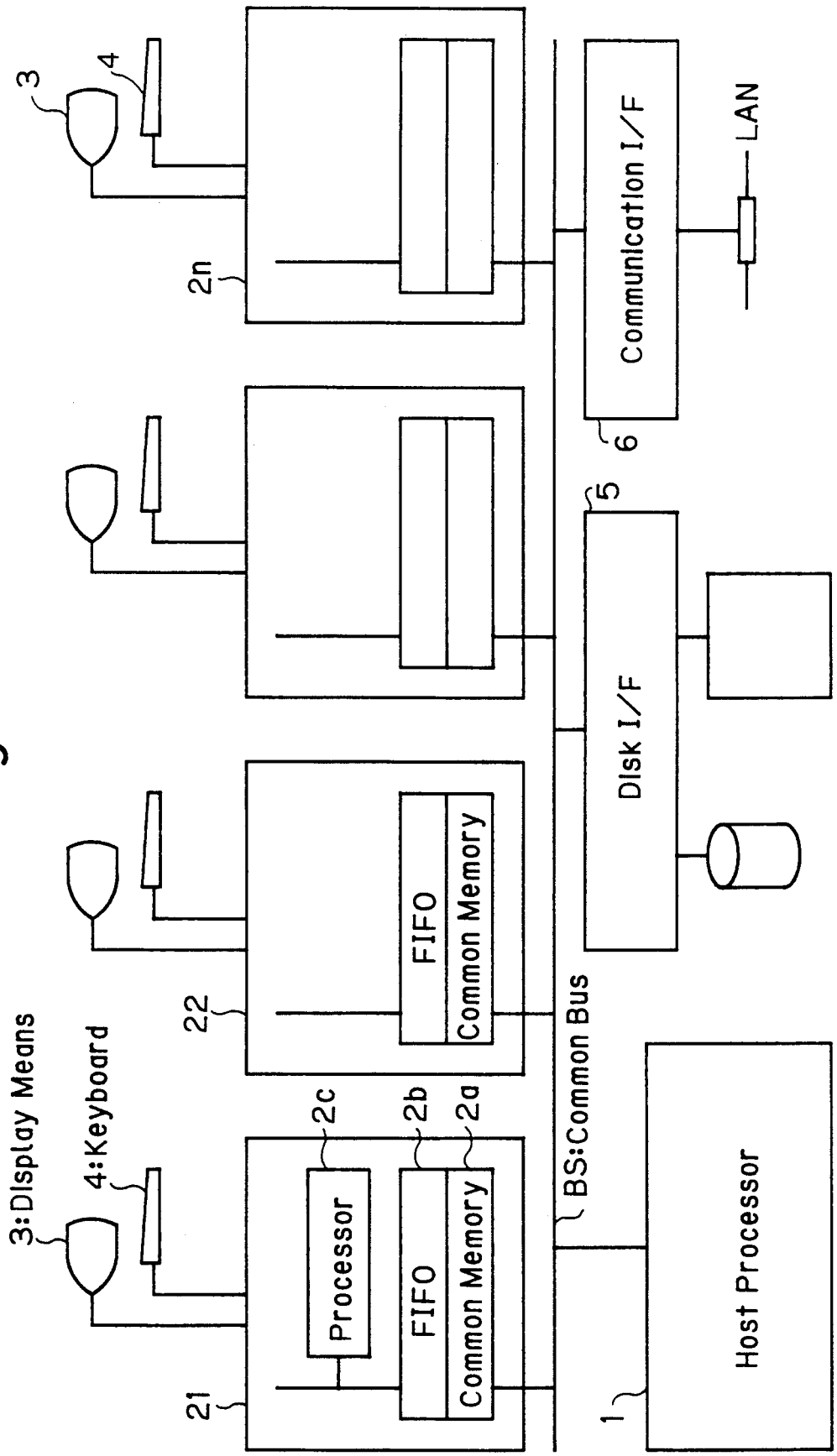
FIG. 2 is a block diagram depicting an illustrative embodiment of the invention.

FIG. 2 depicts a basic configuration of the invention comprising a host processor 1; a plurality of graphic display units $2_1 \ldots 2_n$ connected to host processor 1 through common bus BS; a display means 3; a keyboard 4; interface disk unit 5; and interface communication unit 6. Local area network (LAN) is also connected to common bus BS.

Each of graphic display units $2_1 \ldots 2_n$ comprises a common memory 2a of a two port type, one port being connected to common bus BS and the other port being connected to an internal bus (not numbered), which is used in common by host processor 1 and internal processor 2c, and FIFO (first in, first out) buffer 2b provided as a part of common memory 2a. Internal processor 2c is provided for sharing a part of the processings carried out by host processor 1 and is connected to common memory 2a through the internal bus.

Figure 3:
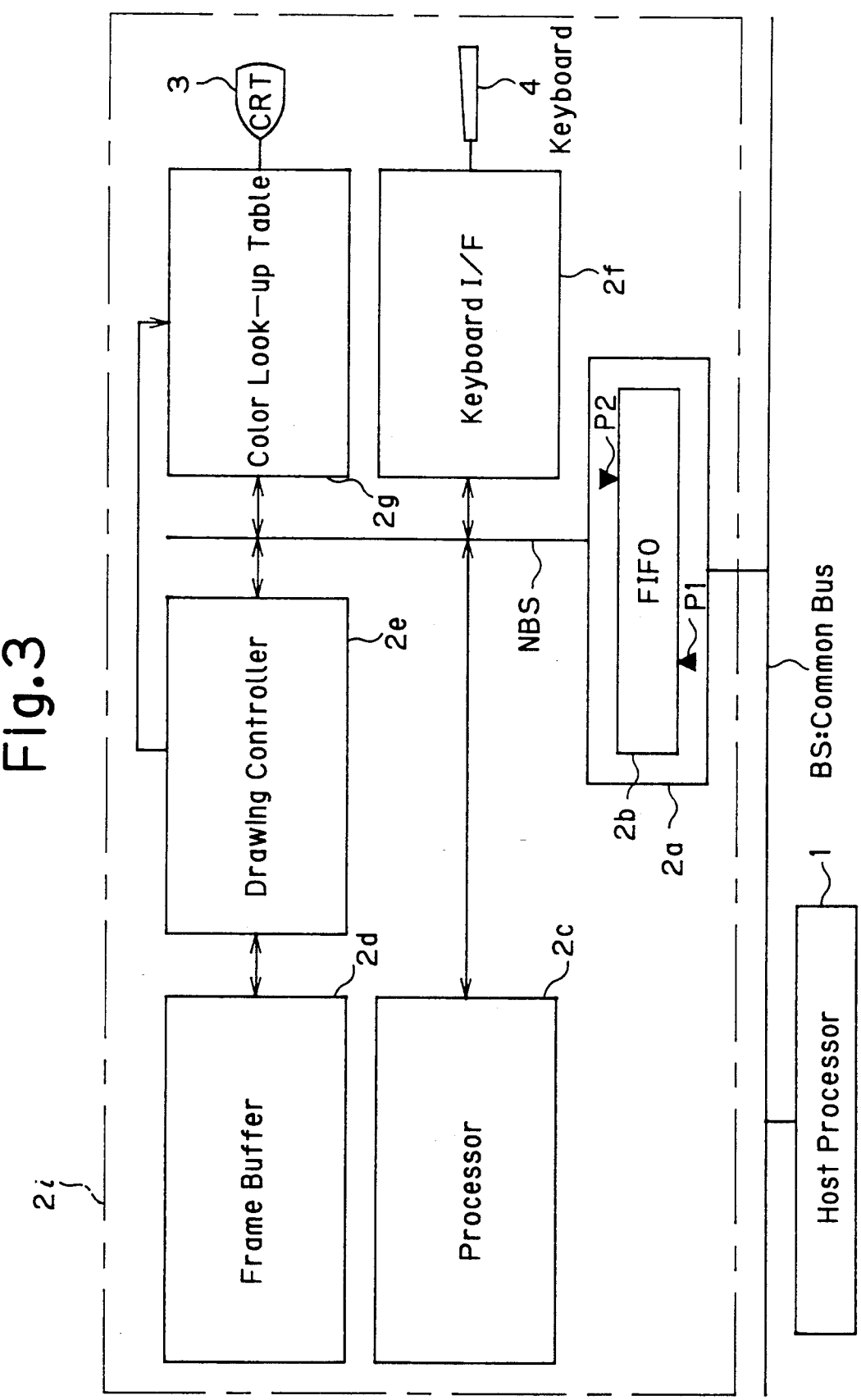
FIG. 3 is a block diagram depicting details of an embodiment of the invention.

FIG. 3 depicts the internal configuration of only one graphic display unit of the invention which is similar to that of the other graphic display unit. Within common memory 2a, FIFO buffer 2b is formed by software and the write and read operations of the commands and data are controlled by PUSH pointer P1, which instructs the write area of data from host processor 1, and the POP pointer P2, which indicates the data read end area of processor 2c.

The other area of common memory 2a is an ordinary common area which allows entry of program code or is used for transmission of other information.

The graphic display unit 2i further comprises frame buffer 2d; drawing controller 2e; keyboard interface 2f; and color look-up table 2g. Drawing controller 2e decodes commands and data read from FIFO buffer 2b, draws necessary pattern or characters on frame buffer 2d or reads them in accordance with the decoded commands and data, and executes graphic display on display means 3 via the color look-up table 2g.

Figure 4:
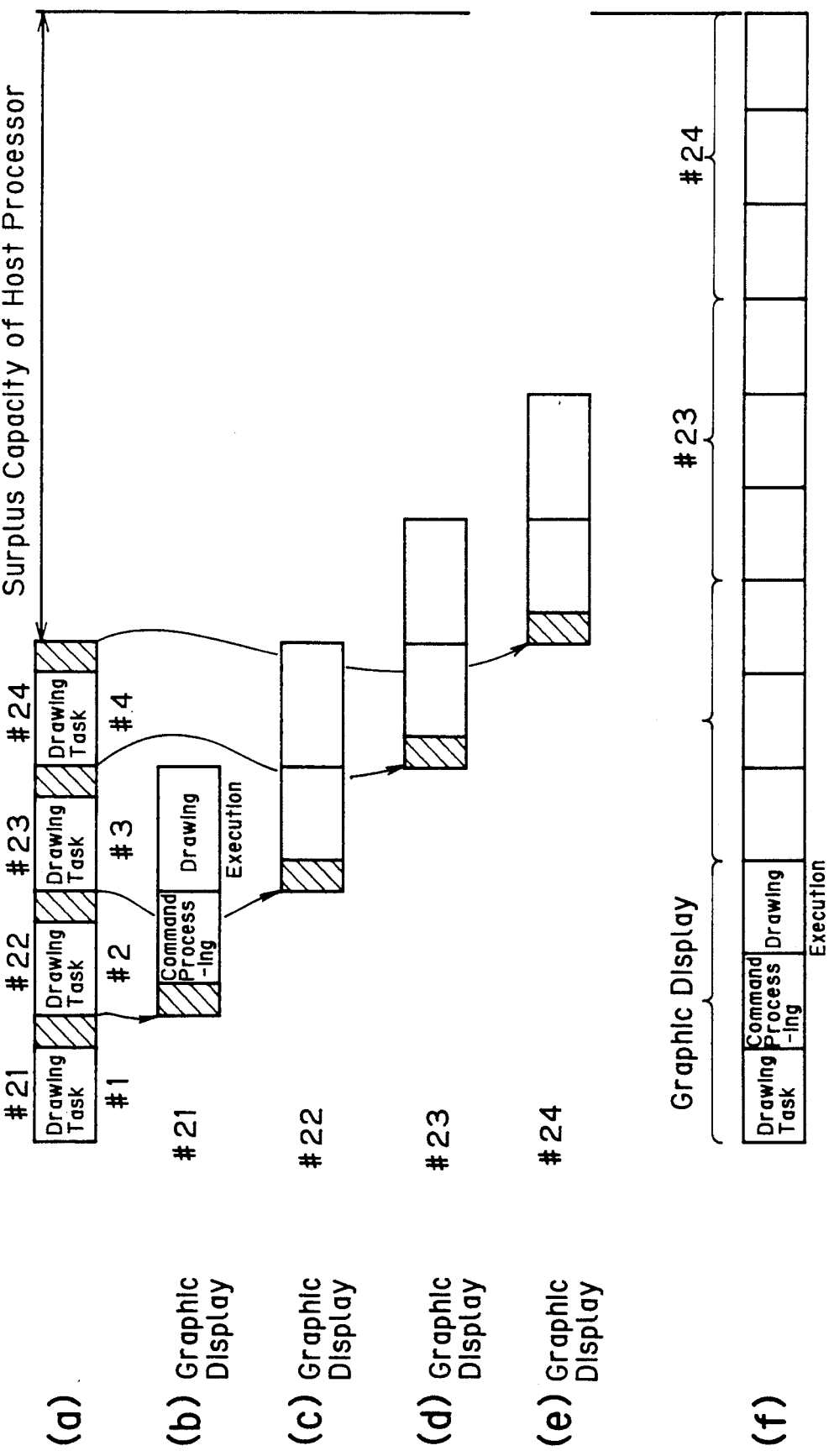
FIG. 4, comprising lines (a)–(f), is a time chart depicting the processings shared by respective devices.

Operation of the FIG. 3 embodiment is further explained in connection with FIGS. 4 and 5, wherein FIG. 4 depicts the sharing of processing by the respective devices. For a plurality of graphic display units $2_1 \ldots 2_n$, host processor 1 sequentially writes, as shown in line (a), high level commands, for example CGI(Computer Graphic Interface) commands which may be executed by drawing controller 2e in the graphic display units to the FIFO buffer 2b of common memory 2a asynchronously with processor 2c and drawing controller 2e. This also causes PUSH pointer P1 of FIFO buffer to go up.

FIFO buffer 2b has sufficient capacity to write command or data group required for displaying a sheet of average graphic panel. Host processor 1 terminates the drawing process without waiting for the end of drawing by the relevant graphic display unit and shifts sequentially to the processing of the next graphic display unit.

In each graphic display unit $2_1 \ldots 2_n$, internal processor 2c compares PUSH pointer P1 and POP pointer P2 locations of FIFO buffer 2b within the common memory 2a and determines the arrival of commands from the host processor 1.

Processor 2c reads high level commands written in FIFO buffer 2b and executes processings such as keyboard communication. Moreover processor 2c also shares a part of the processings, such as interpretation of high level commands, processing to the commands which may be executed by the drawing controller 2e and control of drawing controller 2e, which should intrinsically be done by host processor 1, in order to alleviate burdening of host processor 1.

Drawing controller 2e draws command train on frame buffer 2d in accordance with the commands given from internal processor 2c and also reads such command train.

Lines (b)-(e) show the timing for internal processor 2c to receive command processing and to execute the drawing in each graphic display unit $2_1 \ldots 2_n$. The respective graphic display units execute, in parallel, command processings and drawing tasks, although the overhead for dealing with commands, interpretation of commands and execution control is added.

Line (f) indicates, as a reference, the time chart of the prior art, wherein host processor 1 executes command processing and drawing of the graphic display units.

In comparing lines (a) and (f), reduction of the time chart means alleviation of load shared by the host processor 1, resulting in increase of surplus thereof.

Figure 5:
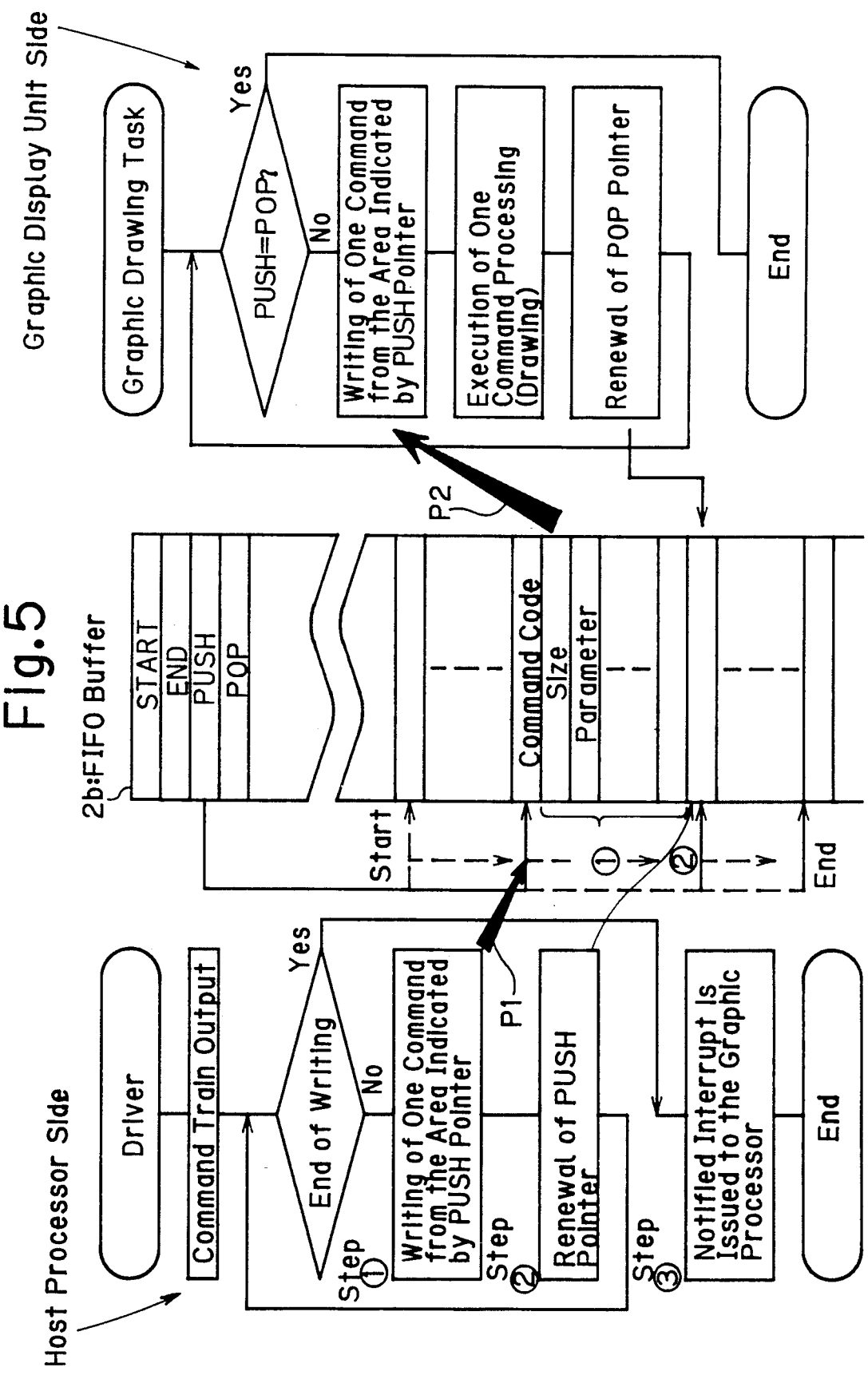
FIG. 5 is a flow chart depicting the outlines of operations conducted by a driver of the host processor through the common memory and the drawing task conducted by the graphic display unit.

FIG. 5 is a flow chart depicting operations conducted by the driver of the host processor 1 through common memory 2a, described above, and outline of drawing task executed by graphic display unit 2.

The driver of host processor 1 first outputs command train to FIFO buffer 2b of common memory 2a for executing the write operation while renewing PUSH pointer P1 command by command from the area indicated by PUSH pointer P1, until the end of write operation thereto (see Steps 1 and 2). Upon completion of the write operation, the notified interruption is issued to drawing controller 2e (see Step 3). In Step 1, when the address reaches the end address during the write operation of one command, the write operation returns to the start and is continued. Such write operation in Step 1 is carried out so that PUSH pointer P1 does not follow up POP pointer P2. Moreover, in Step 2, renewal of PUSH pointer P1 is carried out in such a manner that pointer P1 indicates the location next to the one command written in FIFO buffer 2b.

Internal processor 2c and drawing controller 2e of graphic display unit 2 decides whether the locations indicated by PUSH/POP pointers P1, P2 are the same or not. When these locations are different, processor 2c and controller 2e read one command from the location of FIFO buffer indicated by the POP pointer P2 and interpret such command and then execute the drawing process.

Consequently, the location indicated by POP pointer P2 is renewed to show the heading area of the command next to that read recedingly. When PUSH/POP pointers P1, P2 indicate the same location, the read operation of command terminates.

During such a series of operations, write operation to FIFO buffer 2b and read operation therefrom are carried out asynchronously and commands are stored until FIFO buffer 2b becomes full.

In this case, the control indicated below is carried out. Namely, FIFO buffer 2b previously has space area for one command and when FIFO buffer 2b becomes full, the driver stores therein the command to "notify the interruption of host processor" and once terminates output of command train.

The graphic display unit 2i sequentially reads the contents of FIFO buffer 2b, carries out the drawing control, and finally issues an interruption to the host processor 1, in order to inform the driver of existence of space in FIFO buffer 2b. Upon reception of this information, the driver starts again the write operation of the command train which has been once suspended.

Figure 6:
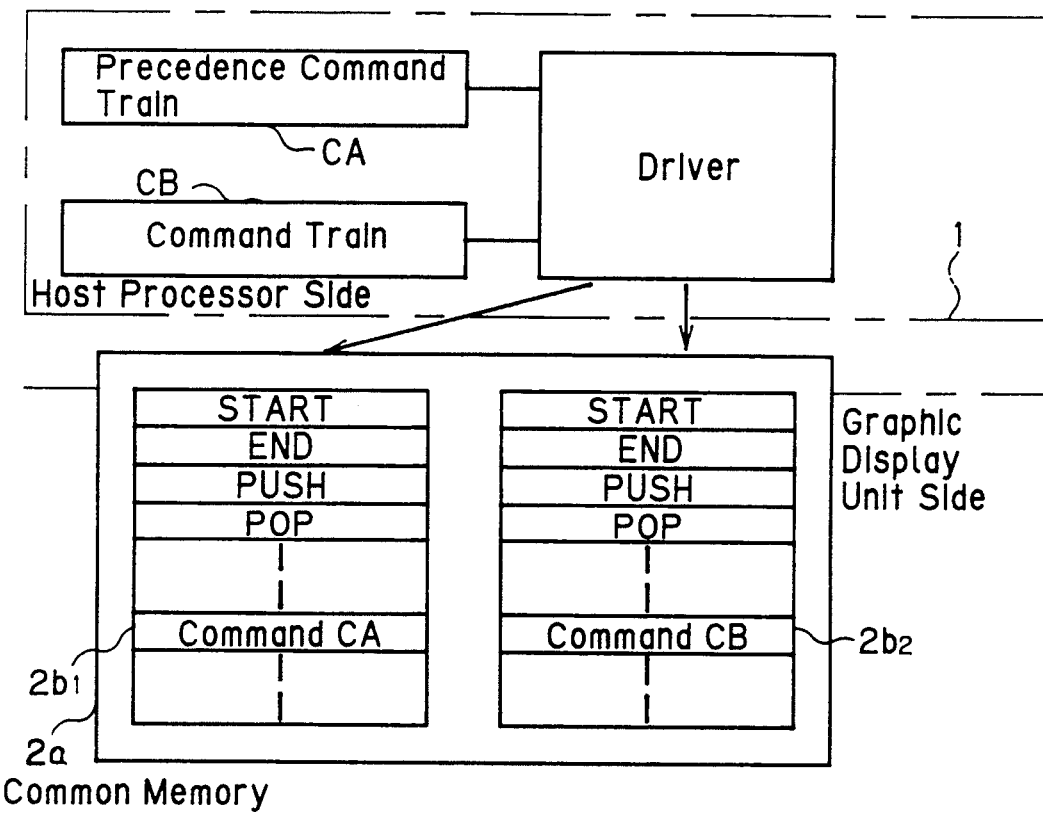
FIG. 6 is a conceptual view depicting the principal portions of another illustrative embodiment of the invention.

FIG. 6 depicts a plurality (two in this embodiment) of FIFO buffers 2b1, 2b2, respectively, for storing command trains in accordance with the processing priority levels with the buffers 2b1 and 2b2 being provided within common memory 2a.

In the embodiment, the driver in host processor 1 writes, for example, command train CA having a high priority level, such as display of alarm information, to preference FIFO buffer 2b1, while the command train CB for ordinary graphic display is written usually to the FIFO buffer 2b2.

Graphic display unit 2 decides first whether the command train is stored in preference FIFO buffer 2b1 or not. In case it is stored therein, unit 2 reads first the command train, and executes the drawing process. On the other hand, when space is generated in preference FIFO buffer 2b1, graphic display unit 2 usually reads the command train stored in FIFO buffer 2b2 and then executes the drawing process.

Figure 7:
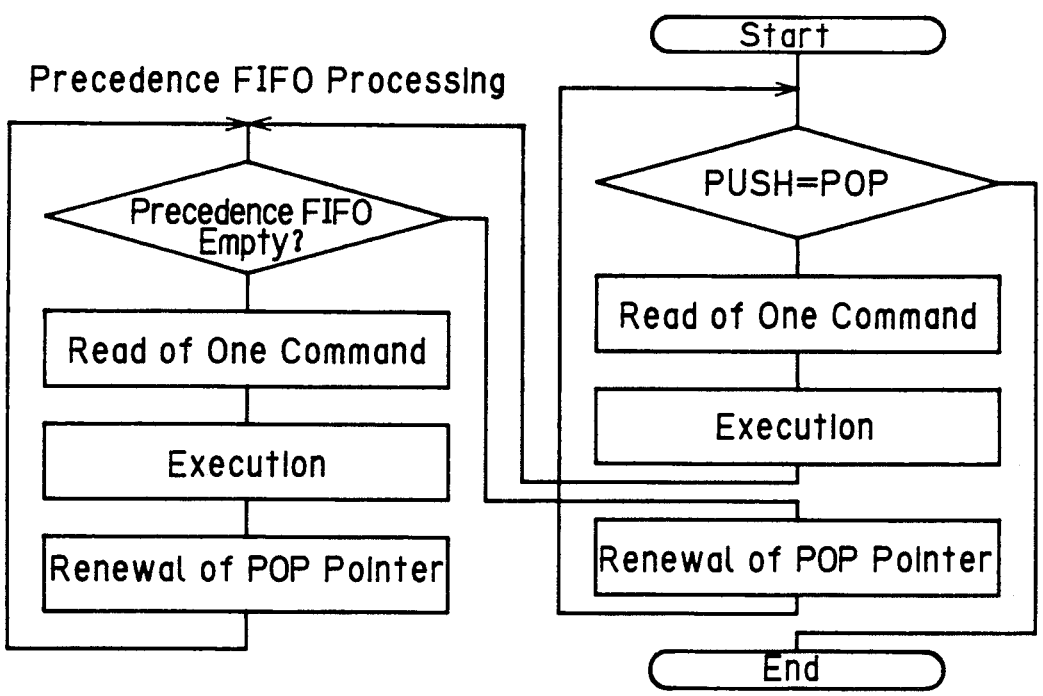
FIG. 7 is a flow chart depicting another example of the operations conducted by a graphic display unit in the embodiment of FIG. 6.

FIG. 7 is a flow chart indicating an example of the operations to be carried out by the graphic display unit in the embodiment of FIG. 6. A decision whether the command train is written in the preference FIFO buffer 2b1 or not is usually carried for each execution of one command during the processing of FIFO buffer 2b2.

With such a configuration, the display having a higher priority level, such as an alarm information, realizes the drawing process in preference to the other graphic display.

According to the embodiment of FIGS. 2, 3, the respective graphic display units share in parallel, in the form of distributed processing, a part of the processings to be intrinsically done by the host processor. Thus, burdening of the host processor is alleviated and the processing capability of the host processor is improved as a whole.

Moreover, the configuration linking the host processor and graphic display units through the FIFO buffer, which is provided within the common memory, eliminates the necessity for the graphic display unit to become the bus master. This enables simplification of the configuration and inhibits the host processor from taking the bus right. Thus, discrepancy in processing speed of the graphic display unit is lowered.

Furthermore, advantageously, since the FIFO buffer is formed in the common memory in the form of software, this common memory can be used freely as a memory and a plurality of FIFO buffers may also be formed as required, and the command train having the higher priority level may be processed in preference to the other command train.

Figure 8:
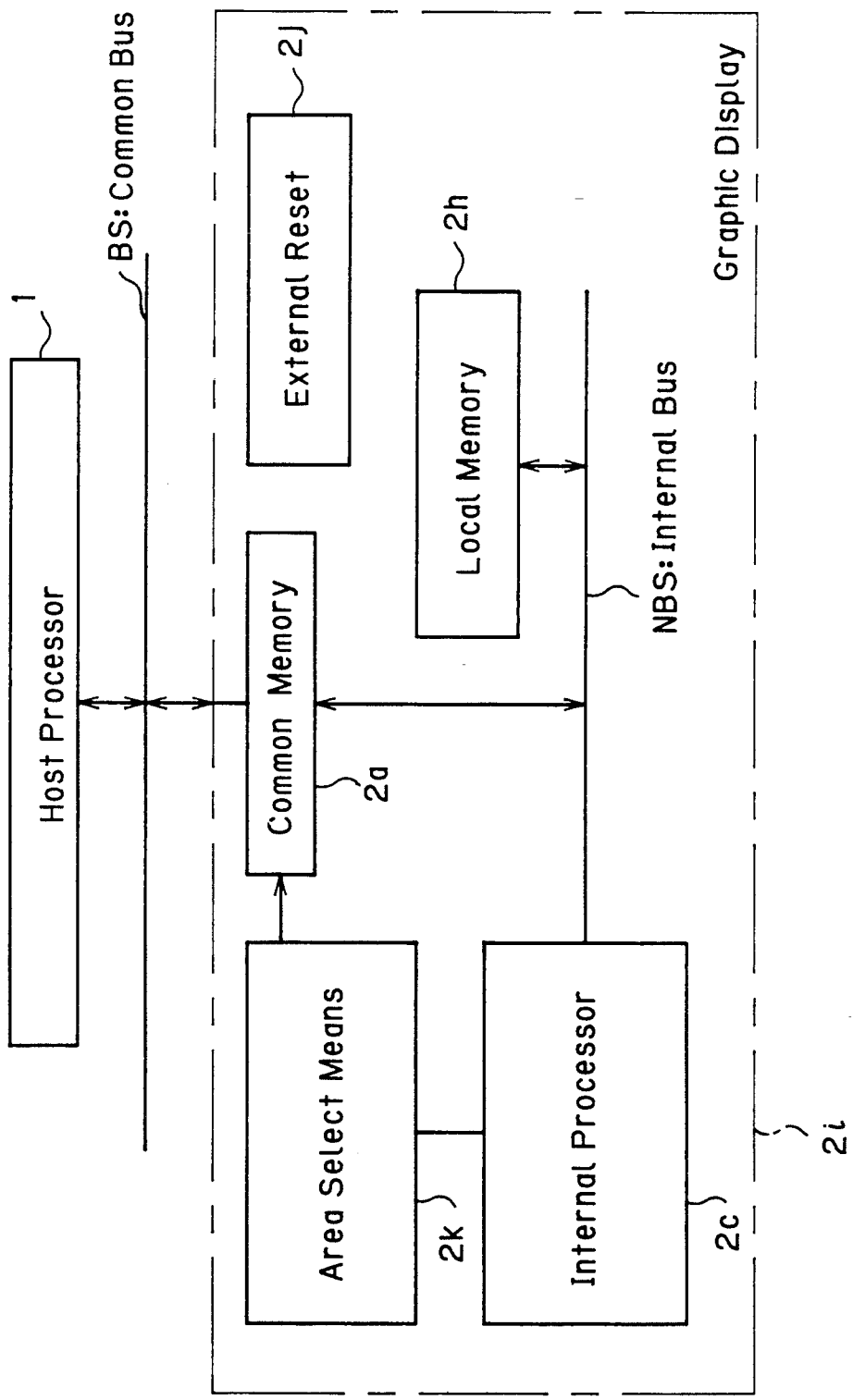
FIG. 8 is a block diagram depicting another graphic display unit of the invention.

FIG. 8 depicts another graphic display unit of the invention, which unit is connected to host processor 1 through common bus BS. This embodiment overcomes the following and other problems presented by the prior art.

The graphic display unit of the prior art usually provides a ROM therein to store operation programs of a microprocessor. In this case, when it becomes apparent that the programs stored in the ROM include bugs, it is essential to replace the ROM, which is loaded inside. Also, indirect bug elusion by the programs from the host processor may present a problem. Furthermore, replacement of operational programs, including the loading of corrected programs, from the host processor, causes maintenance problems.

FIG. 8 depicts an embodiment of the invention which overcomes such problems. Namely, the ROM for storing operational programs to be executed by the internal processor is omitted to thereby save space and improve maintenance.

In FIG. 8, graphic display unit 2i has a common memory 2a, which is also used in common with host processor 1, allowing the one to be connected with the common bus BS and the other to be connected with the internal bus NBS. Common memory 2a is configured to change assignment of address space observed from the internal processor 2c to be two kinds of spaces. The display 2i comprises an external reset means 2j which sets or cancels the reset mode of the apparatus with a command from host processor 1; area select means 2k for switching assignment of the two kinds of spaces in common memory 2a in accordance with instructions from host processor 1 and internal processor 2c; and local memory 2h connected to internal bus NBS.

Common memory 2a is capable of dynamically changing the assignment to two kinds of spaces of the reset vector area and the ordinary memory area depending on the instructions from host processor 1 or from internal processor 2c. In the reset mode, host processor 1 assigns common memory 2a to the rest vector area, and loads thereto the operational programs. After canceling the reset mode, internal processor 2c transfers the operation program loaded to the vector area to local memory 2h and assigns common memory 2a to the ordinary memory area for transfer of high level command/data sent from host processor 1.

Figure 9:
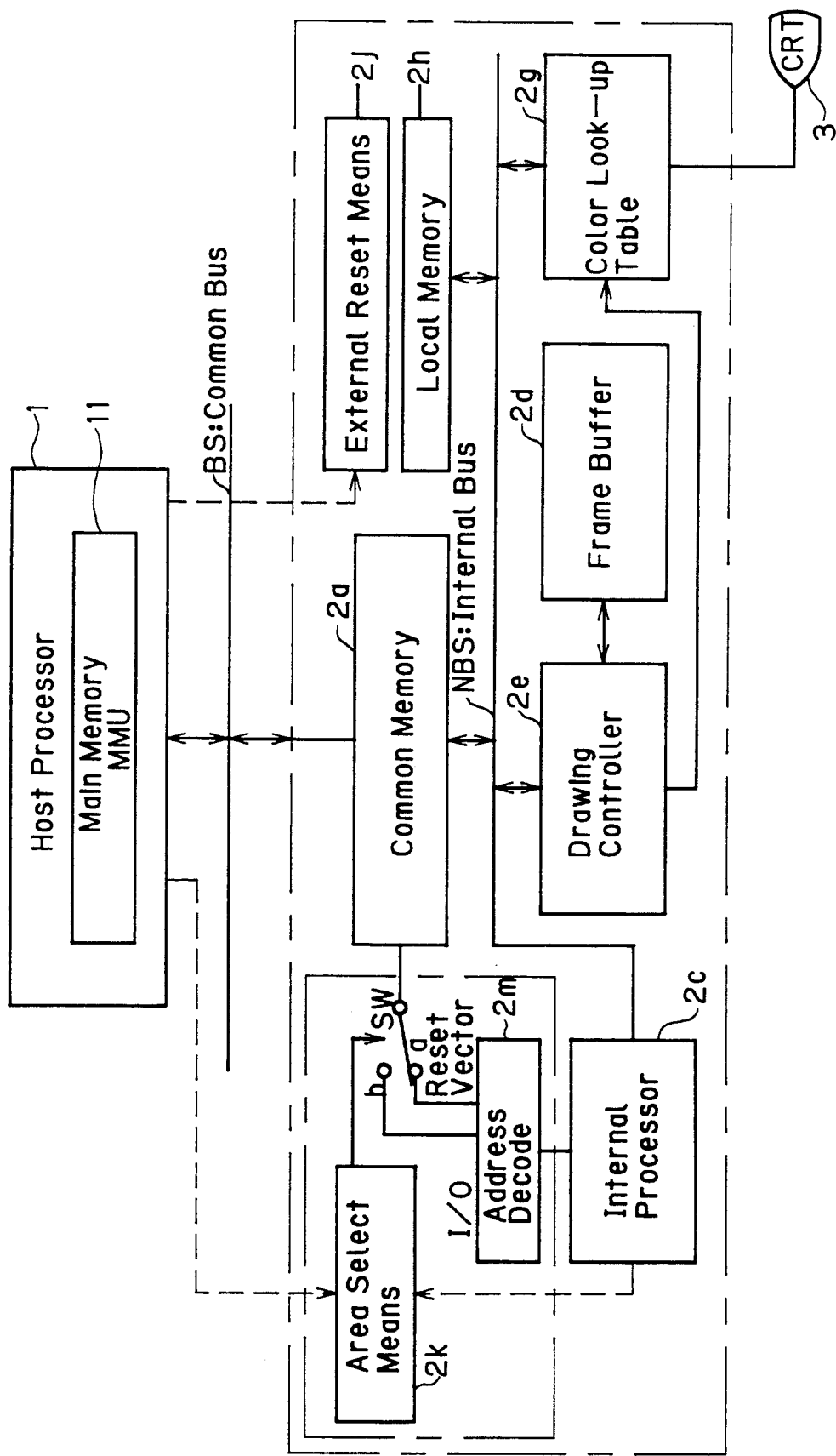
FIG. 9 is a block diagram depicting details of the embodiment of FIG. 8.

FIG. 9 shows further details of the invention graphic display unit of FIG. 8, wherein internal bus NBS is connected, in addition to common memory 2a, internal processor 2c, and local memory 2h, to drawing controller 2e and frame buffer 2d, and color look-up table 2g through drawing controller 2e. CRT 3 is used as a display means.

Common memory 2a is so configured that the address space thereof is dynamically assigned to two kinds of spaces of the reset vector area and the ordinary memory area, depending on the switching by a switch SW. Namely, switch SW is enabled to any portion of positions a, b with an output from area select means 2k. Common memory 2a is informed through switch SW whether (a) the address corresponds to that decoded by the address decoding means 2m and designates the reset vector area sent from internal processor 2c; or (b) designates the ordinary memory area so that the address space can be dynamically assigned to either space of the reset vector and the ordinary memory areas.

Figure 10:
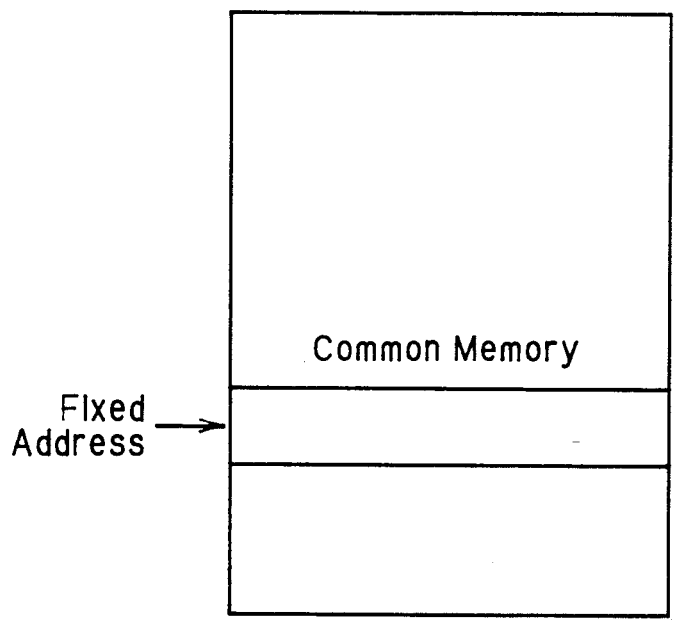
FIG. 10 is a conceptual view depicting the address space of the memory in the side of the graphic display unit as observed from the host processor.
Figure 11A:
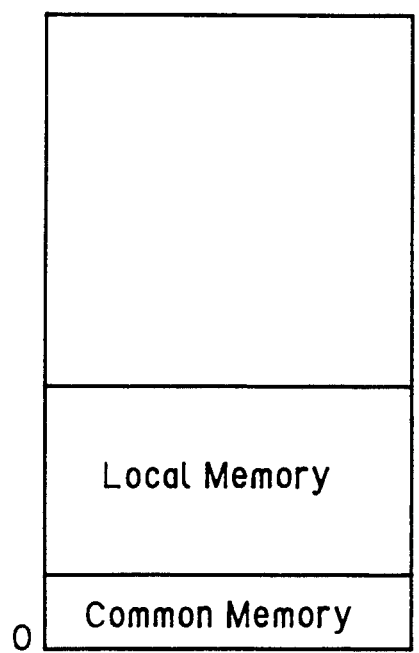
FIGS. 11(a) and 11(b) are conceptual views depicting the address space of the memory as observed from an internal processor of the graphic display unit.
Figure 11B:
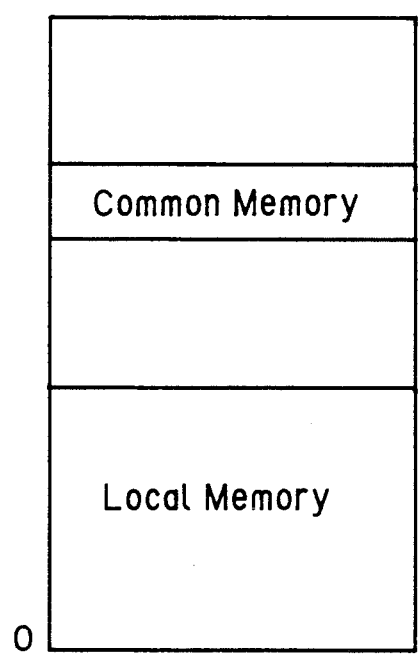

With the FIGS. 8, 9 embodiment, as shown in FIG. 10, common memory 2a is placed at a certain fixed address in the address space in the graphic display unit side as observed from the host processor. Meanwhile, as shown in FIG. 11(a), in the address space of the memory as observed from internal processor 2c of the graphic display unit, the common memory is assigned to the reset vector area ($\sim 0$), when switch SW is set to the position a by area select means 2k. On the other hand, as shown in FIG. 11(b), the address space of the memory is assigned to the ordinary memory area when switch SW is set to position b.

The local memory is also assigned to include the reset vector area. If switch SW is set to position a, the overlap area is masked.

The operation of the just described embodiment will be explained with reference to FIG. 12, wherein the operations conducted by host processor 1 and internal processor 2c are depicted. First, host processor 1 sends a command to external reset means 2j to reset internal processor 2c in graphic display unit 2i. Simultaneously, host processor 1 sends a command to area select means 2k, sets switch SW to position a and maps common memory 2a to the reset vector area (Step 1).

Next, host processor 1 loads a load program for the program itself to common memory 2a (Step 2).

Host processor 1 sends a command to external reset means 2j to start resetting of internal processor 2c (Step 3). Thus, the program which is loaded on common memory 2a is caused to run.

Consequently, internal processor 2c copies the program itself to local memory 2h by the program and causes the program for loading the program itself to run after jumping to the copied program (Step 4). Internal processor 2c first sends a command to area select means 2k in accordance with the loading program of the program itself, sets switch SW to position b, remaps common memory 2a to the ordinary memory area, uses this memory area as the buffer and loads the program itself to local memory 2h from host processor 1 (Step 5).

In this case, host processor 1 loads the program itself to local memory 2h, in cooperation with the program loaded in Step 5, using common memory 2a.

Consequently, internal processor 2c starts operations as the graphic display unit in accordance with the program loaded to the local memory 2h (Step 6).

This operation may be started by jumping from the program loaded in Step 5, but, in general, the operation is started by the reset signal from external reset means 2j with instructions from host processor 1. Also, initialization of the hardware may be provided.

In the consequent operations, internal processor 2c uses common memory 2a for receiving and sending the high level command/data from/to host processor 1 and shares a part of the operations of host processor 1 by the high level command interface (for example, CGI) for graphic use.

In the foregoing embodiment of FIGS. 8, 9, common memory 2a is connected at one end directly to the system bus BS. However, such direct connection to the system bus is not necessary if a designated address and data can be written through communication from host processor. 1.

As described, according to this embodiment, the ROM for storing operation program to be executed by internal processor 2c and data is eliminated from graphic display unit 2i. Thus, savings of space results and later replacement of the ROM is not necessary so that maintenance is improved. Moreover, even when large capacity operation programs are used, it may be booted up by preparing sufficient capacity for loading a minimum boot program.

Since the operation program is executed after it is transferred to the local memory thereby ensuring fast access speed, speed down by competition of bus access can be avoided and performance can also be improved in comparison with the case where operation program is stored in the common memory and then it is executed.

Figure 13:
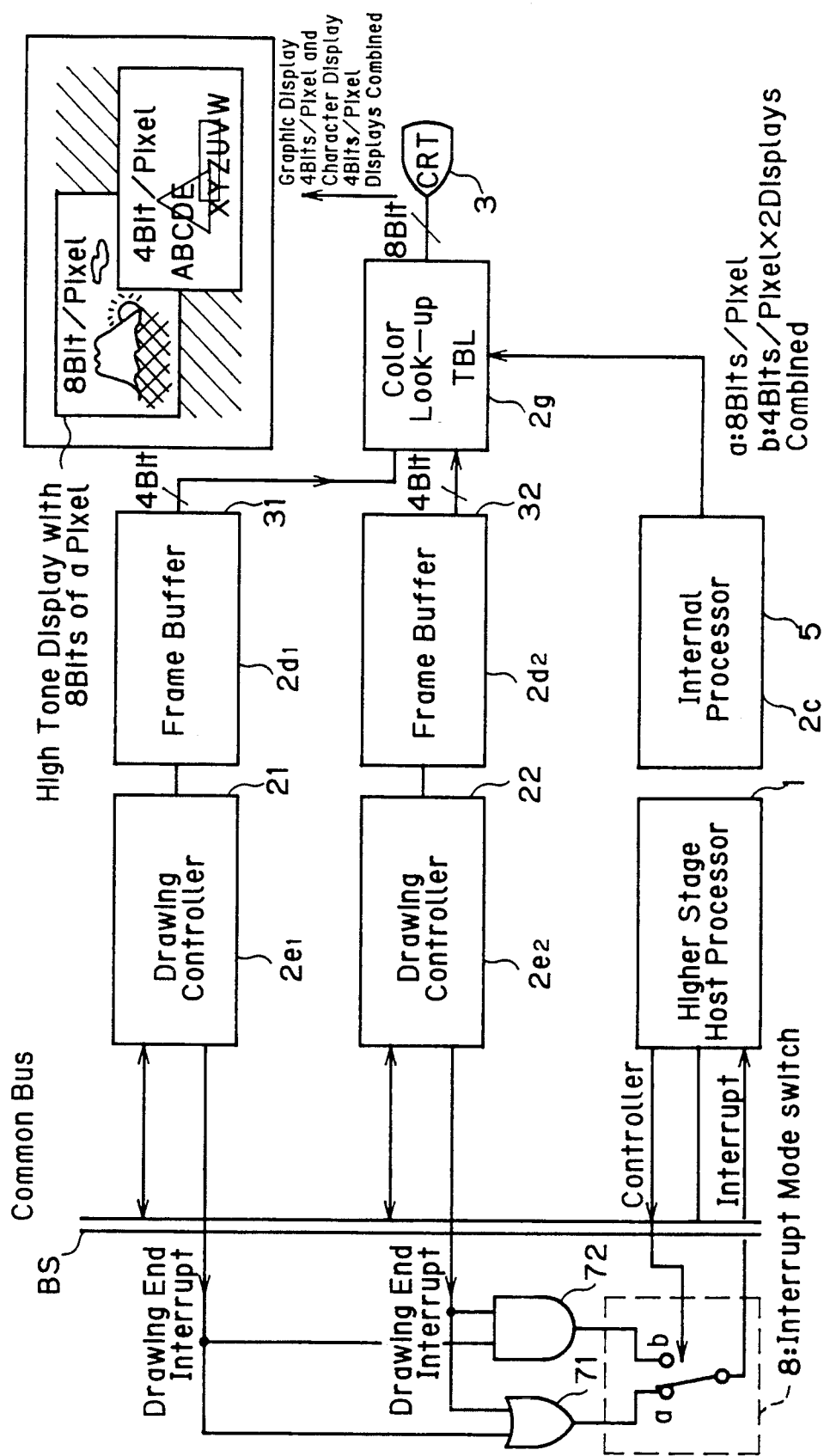
FIG. 13 is a block diagram depicting the principal portions of another graphic display unit.

FIG. 13 depicts still another invention graphic display unit 2i wherein a plurality of drawing controllers $2e_1 \ldots 2e_n$ are used. The graphic display unit of FIG. 13 processes in parallel shared drawing commands to be processed by such drawing controllers, or processes in the shared memory bits forming a pixel (for example, 8 bits/pixel). In such a graphic display unit, the end of the command train is detected by polling the status of the respective drawing controllers $2e_1 \ldots 2e_n$ or by receiving the drawing command end interrupt from the respective drawing controllers.

The parallel processing type graphic display unit generates the same image with a plurality of drawing controllers or displays superimposed images by generating different images with respective drawing controllers. In case a plurality of drawing controllers generate the same image, the drawing command processings by a plurality of controllers must be synchronized in order to prevent disturbance of display. On the other hand, when respective drawing controllers generate respective images and superimpose them for display, such synchronization is not necessary.

The apparatus of the prior art has conducted such control only with the software processing, resulting in the problem of coexistence of acquisition of performance and synchronous drawing.

The embodiment of FIG. 13 resolves such problem of the prior art by attaining (1) synchronous drawing by using a plurality of drawing controllers for creation of a drawing, and (2) improvement of drawing performance when independent images are drawn by a plurality of drawing controllers with these being displayed as a synthetic image.

In FIG. 13 drawing controller 2e1, 2e2 function to interpret and execute the drawing command train given through common bus BS from higher host processor 1 and also execute drawing on frame buffers 2d1, 2d2. In this case, two drawing controllers are used, but more may be used.

The embodiment comprises a color look-up table 2g which is responsive to the input from frame buffers 2d1, 2d2; and an internal processor 2c as a display engine which functions to read image data stored in frame buffers 2d1, 2d2 and guides such data to color look-up table 2g. Internal processor 2c is so structured that two kinds of window type display, for example, the synthetic display of two images of 8 bits/pixel and 4 bits/pixel is realized by changing, on a real time basis, the mapping of color look-up table 2g.

A display means 3, such as a CRT, displays the display data from color look-up table 2g.

An AND circuit 71, which is responsive to the inputs, notifies the end of the drawing from a plurality of drawing controllers 2e1, 2e2. An OR circuit 72, which is responsive to the inputs, notifies the end of the drawing from a plurality of drawing controllers 2e1, 2e2. An interrupt mode changeover switch 8 selects a signal from either AND circuit 71 or OR circuit 72, and gives the selected signal to a higher host processor 1 as an interrupt signal. Changeover switch 8 is formed by software.

For example, changeover switch 8 is set to the side of contact a and the signal from AND circuit 71 is switched for the drawing on the window of two images of 4 bits/pixel(with the drawing controllers 2d1, 2d2). On the other hand, changeover switch 8 is set to the side of contact b and the signal from the OR circuit 72 is selected for drawing on the window of 8 bits/pixel (with drawing controllers 2e1, 2e2 sharing 4 bits and drawing the same image simultaneously).

The operation of the FIG. 13 embodiment is as follows. The drawing of the 8 bits/pixel image will first be explained. In this case, changeover switch 8 is set to contact b with a command from host processor 1. Moreover, drawing controller 2e1, 2e2 receive almost the same drawing command train, except for the color data, from host processor 1 and processes such command train. If the processing of the drawing command train is asynchronized and the processing of drawing controller 2e1, for example, is delayed, a code not defined appears in the synthetic image, flickering or disturbing the displayed image. In the embodiment, the end of the drawing message at drawing controllers 2e1, 2e2, is applied as interruption to host processor 1 through OR circuit 72 and changeover switch 8. On the other hand, host processor 1 having received such interruption outputs a command for queuing of events, causing the two drawing controllers to operate synchronously.

Next, changeover switch 8 is set to contact a with a command from host processor 1 for the drawing of an image on the window for synthetic two images of 4 bits/pixel. In this case, drawing controllers 2e1, 2e2 may be operated independently and the end of the drawing message is also independently applied to host processor 1 through AND circuit 71 and changeover switch 8.

As described, host processor 1 connects changeover switch 8 to contact b for the drawing of an image of 8 bits/pixel to give the signal from the OR circuit 72 by interruption, then applies the drawing command train to drawing controllers 2e1, 2e2 and then connects the changeover switch 8 to contact a upon reception of the drawing end interrupt signal. Thus, deterioration of performance is prevented by eliminating disturbance of display due to defective synchronization of drawings.

Figure 14:
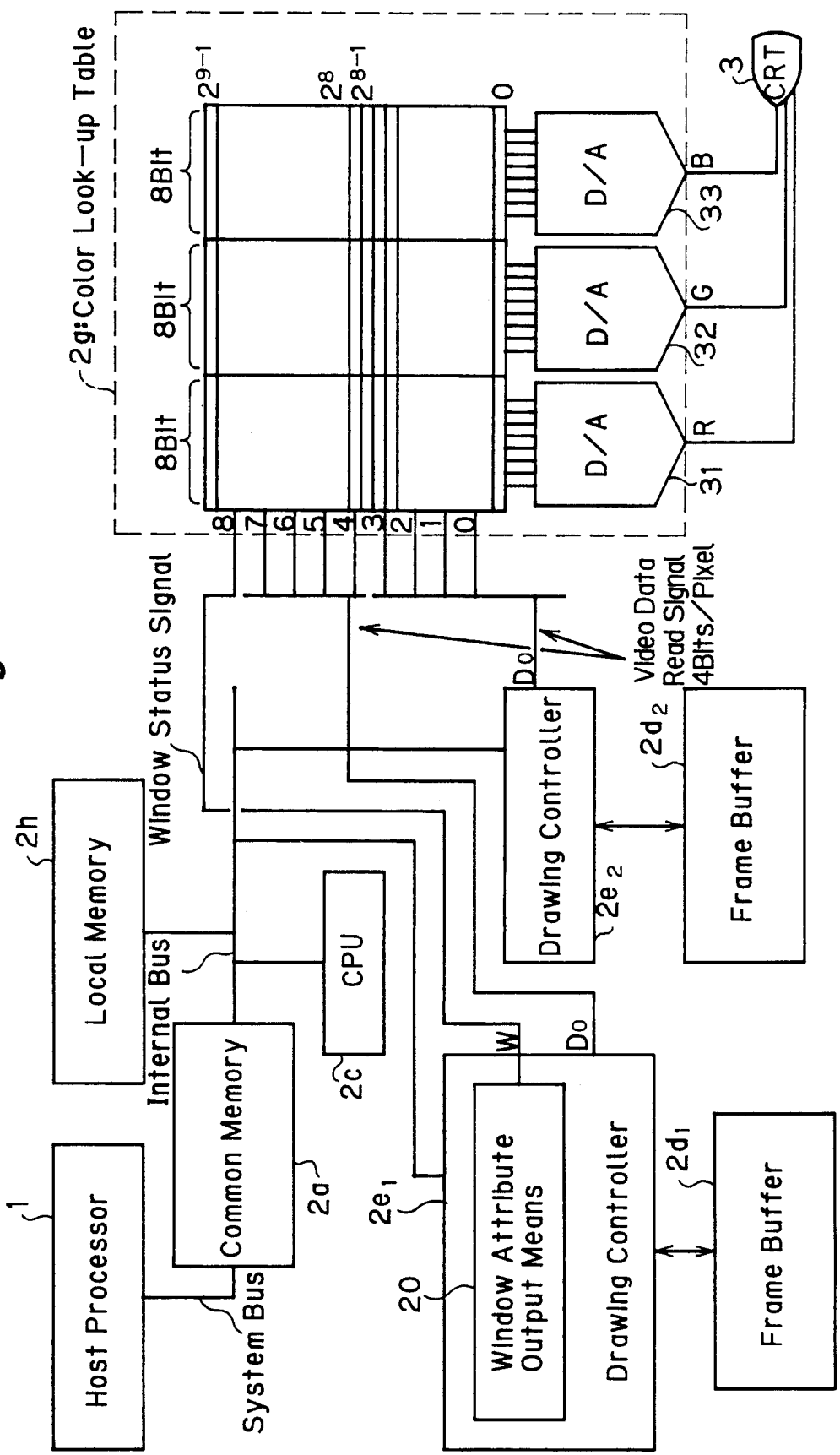
FIG. 14 is a block diagram depicting still another graphic display unit of the invention.

FIG. 14 depicts another illustrative embodiment which utilizes a synthetic display of the standard bit map window and a special window for emulating a screen comprising character display and graphic display. This embodiment overcomes the following and other problems presented by the prior art.

The conventional graphic display unit of a certain type is formed with the character plane and graphic plane, with capability of independently controlling the character plane and graphic plane. Therefore, such a conventional apparatus is characterized by reversible edition being done by scrolling only the character display with the graphic display being fixed. Since the character display generally allows rewriting at a high speed, when a table, which changes from time to time, is to be displayed, only the background is displayed with the graphic plane and character data to be altered is often displayed by the character plane.

However, providing two kinds of planes (i.e. character plane and graphic plane) requires increased capacity of the hardware. Moreover, since large scale integration (LSI) which assures high speed drawing and display of characters, is now available for application even in the graphic plane, it is now required to configure the graphic display only with respect to the graphic plane.

In this case, however, if one pixel, several bits, are used uniquely, it is impossible to scroll only the character in case the character and graphic are displayed simultaneously. Thus, with the prior art apparatus, perfect emulation cannot be executed.

The FIG. 14 embodiment of the invention has solved such problems and enables graphic display and character display to be superposed on one window of a multi-window arrangement, whereby such displays can be controlled individually and this window and other standard window can be displayed simultaneously.

In the embodiment of FIG. 14, the number of bits of one pixel is selected to be 8 bits. Two frame buffers 2d1, 2d2, respectively, employ four bits per pixel. For example, the DRAM of 2 MB is used.

A pair of drawing controllers 2e1, 2e2, for drawing-/display control, are coupled to frame buffers 2d1, 2d2. Included therein is a window attribute output means 20. The drawing controller 2e1, 2d2, makes a drawing on the corresponding frame buffer 2d1, 2d2, during the drawing mode, depending on the command from internal processor 5 and functions as the command output means. The drawing controller also forms the multi-window on the display screen, during the display mode, by programmable reading data from frame buffer 2d1, 2d2.

The drawing controller which performs such drawing/display coprocessor functions can be a CPU 82786 by Intel, for example. This outputs a window status signal of one bit indicating the window attribute from terminal W and also outputs video data of 4 bits/pixel from data output terminal DO.

A color look-up table 2g comprises entries 0 . . . 511. Of these entries, the half 0 . . . 255 is used for storing color data to display the ordinary window of 8 bits/pixel, and the remaining half 256 . . . 511 is used for superimposed display of two images of 4 bits/pixel.

Moreover, the window status signal from drawing controller 2e1 for controlling drawing/display is assigned to the most significant bit (MSB) of the color look-up table 2g to change the map in accordance with the attribute information of the window.

Color look-up table 2g prepares 8 bits for each color, of color red R, green G and blue B; and the color data read from each table is outputted to CRT 3, which is used as the display means, through D/A converters 31, 32, 33.

A common memory 2a, used in common with host processor 1 and internal processor 2c, is loaded from host processor 1 with parameters for the drawing.

Operation of the FIG. 14 embodiment will be discussed in connection with FIGS. 15, 16, and 17(a)-17(c). In the following description, it is assumed that the terminal emulation window of the character plane and graphic plane is operated.

Figure 15:
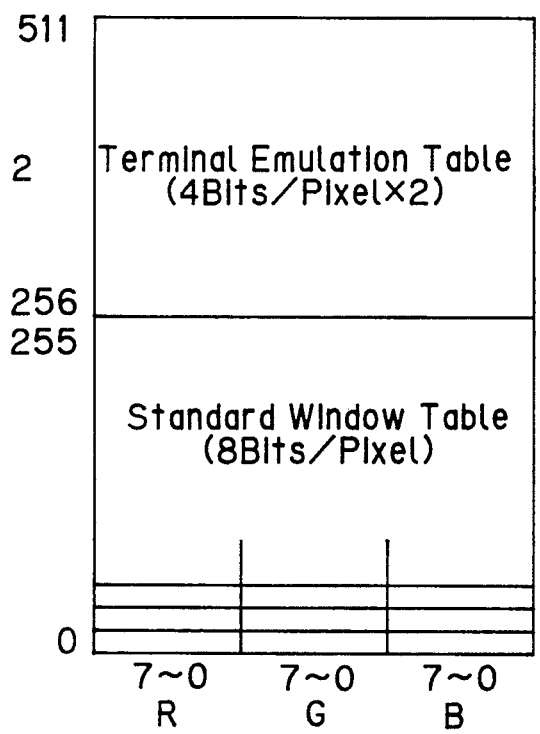
FIG. 15 is a conceptual view depicting the internal configuration of the color look-up table of FIG. 14.

As shown in FIG. 15, in case a standard window is used when the window attribute signal from the window attribute output means 20 is "0" and the terminal emulation window is used when such signal is "1", color look-up table 2g becomes the area for storing color data for the standard window in the entries 0 to 255, or becomes the area for terminal emulation in the entries from 256 to 512.

While drawing controllers 2e1, 2e2 are scanning the standard window, the data of 8 bits/pixel refers to the table for the standard window formed int he area of entries 0 to 255, reads the signal intensity data of R, G, B written therein, and this data is D/A converted to form the color signals and then finally displayed on CRT 3.

The window for terminal emulation realizes the character plane with one drawing controller 2e1 of the two drawing controllers 2e1, 2e2 and the graphic plane is realized with the other drawing controller 2e2, respectively, on the basis of 4 bits/pixel.

In the case of the superposed display of the character plane and graphic plane, the character display area is given priority to the graphic plane and character display is carried out on the graphic plane. In case no display of character plane is indicated by code "0, 0, 0, 0", the color look-up table 2g is sufficient when the color code of the graphic plane is defined only in the area of "1,0,0,0,0, X,X,X,X" , wherein the header 1 represents the terminal emulation area and X represents 1 or 0.

Figure 16:
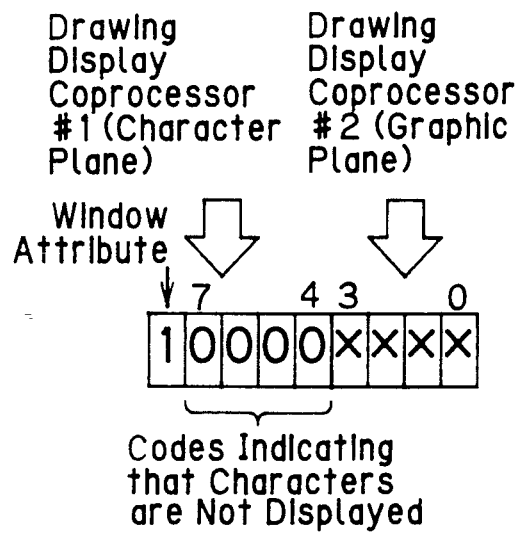
FIG. 16 is a conceptual view depicting video data as applied to the color look-up table of FIG. 14.

FIG. 16 is an example of the video data given to color look-up table 2g, wherein "X,X,X,X" of the 0th-3rd bits represent video data with 4 bits/pixel, given from drawing controller 2e1 for the graphic plane, while "0,0,0,0" of the 4th-7th bits represent video data (in this case, the code indicates that the character is not displayed) given from the drawing controller 2e1 for the character plane. The 8th bit, which is the MSB, is given a signal representing the window attribute drawn on the frame buffer (in this case, "1" represents the terminal emulation window) from the window attribute output means 20, while the display scanning operation of the window is carried out.

When the video data indicated here and the signal representing window attribute are given to color look-up table 2g, only the data of the graphic look-up plane is displayed.

Figure 17C:
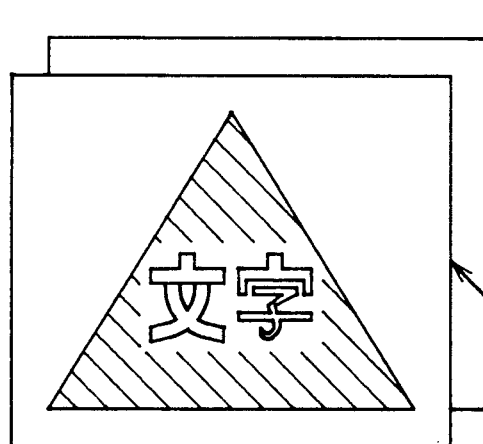
FIGS. 17(a)–17(c), are conceptual views depicting superimposed displays of the character plane and the graphic plane.
Figure 17B:
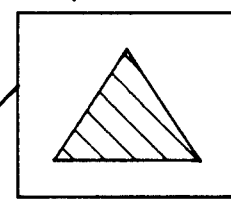
Figure 17A:
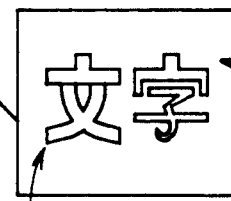

FIGS. 17(a)–17(c) represent a conceptual view of the superimposed display of the character plane and the graphic plane.

FIG. 17(a) represents the character plane drawn on the frame buffer 2d1 by drawing controller 2e1, and the video data output, during display scanning, from drawing controller 2e1 is outputted in such a manner that the color code, other than "0,0,0,0", is outputted for the character part, while the color code "0,0,0,0" is outputted for the part other than the character part.

FIG. 17(b) is the graphic plane drawn on frame buffer 2d2 by drawing controller 2e2. Drawing controllers 2e1, 2e2, respectively, receive commands from internal processor 2c and carry out the drawing on the character plane and the graphic plane and display scanning in accordance with such commands.

As a result of the superposed display of the plane of FIG. 17(a) and the plane of FIG. 17(b), the character and graphic planes are mixed, as shown in FIG. 17(c) and when they are superposed, the character is preferentially displayed.

Moreover, the character plane and the graphic plane are independently controlled by drawing controllers 2e1, 2e2, thereby allowing individual scrollings.

FIG. 18 is an example of a definition written in the terminal emulation area, e.g. entries 256 to 512, of color look-up table 2g. In the area defined by $101 to $10F, the graphic plane display color is defined so that only the graphic displayed without character display. In addition, in the area defined by $110 to $1FF, the character plane color is defined. In the area of $100, black (i.e. colorless) is defined and both the character plane and the graphic plane are colorless.

The display priority of divided pairs of n bits/pixel can be changed by updating the contents of the color look-up table 2g. Thus, it is possible to momentarily change the display in such a manner that the graphic is preferentially displayed on the character in place of the display of character with priority given to the graphic display.

In the foregoing description, the terminal emulation window of the character plane and the graphic plane is operated, but in case all the bits of one pixel are drawn by drawing controller 2e1, 2e2, like ordinary bit map windows, the same command is given simultaneously to all drawing controllers from the internal processor to conduct parallel processing in order to realize high speed drawing/display.

In the above embodiment of FIG. 14, the status signal of one bit is outputted from the window attribute output means as window attribute information, but each window may be given individual color maps by providing a variety of signals which can be recognized for each window as the window attribute information.

Moreover, a pair of drawing controllers are used in the foregoing embodiment, but a greater number can also be used. Also, the windows superposing a plurality of planes, such as bit map window and terminal emulation window, etc., may simultaneously be displayed.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A graphic display system comprising
a plurality of graphic units;
a host processor; and
a common bus,
said plurality of graphic display units being connected to said host processor via said common bus, wherein each of said plurality of graphic display units comprises
an internal bus, and
a common memory comprising a plurality of FIFO buffers, said common memory having two ports, one of said ports being connected to said common bus, and another of said ports being connected to said internal bus, wherein
said plurality of FIFO buffers are used for sequential first in first out transmission of a plurality of commands or information from said host processor.

2. A graphic display system comprising
a plurality of graphic display units;
a host processor; and
a common bus,
said plurality of graphic display units being connected to said host processor via said common bus, wherein each of said plurality of graphic display units comprises
an internal bus,
a common memory comprising a FIFO buffer, said common memory having two ports, one of said ports being connected to said common bus, and another of said ports being connected to said internal bus, wherein said FIFO buffer is used for sequential first in first out transmission of commands or information from said host processor,
an internal processor coupled to said internal bus and functioning as a command output means;
a plurality of frame buffers,
a plurality of controllers coupled to said internal bus and to said plurality of frame buffers for placing a command train from said FIFO buffer in said plurality of frame buffers in accordance with commands given from said internal processor and for reading said command train, and
a color look-up table responsive to video data outputted from said frame buffers for outputting data to a display means.

3. A graphic display unit having an internal processor for displaying graphics on a display means by receiving drawing command and information sent from a host processor, said unit comprising
a common memory used for changeable assignment of addresses to a set vector area or an ordinary memory area of said common memory
reset means connected to said host processor for setting and canceling a reset mode of said unit in accordance with commands from said host processor;
an area select means for switching assignment of the addresses in the set vector area or the ordinary memory area of said common memory in accordance with commands from said internal processor; and a local memory connected to said internal processor and said common memory through an internal bus, wherein during the reset mode said host processor assigns addresses to a set vector area of said common memory, and loads operation programs into said set vector area, and when the reset mode is canceled, said internal processor transfers the operation program from the said vector area to an ordinary memory area, and uses said common memory for transmission of commands or information sent from said host processor.

* * * * *